(12) United States Patent
Nomura

(10) Patent No.: US 11,775,790 B2
(45) Date of Patent: Oct. 3, 2023

(54) IMAGE FORMING APPARATUS AND STORAGE MEDIUM

(71) Applicant: KONICA MINOLTA, INC., Tokyo (JP)

(72) Inventor: Shoichi Nomura, Machida (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 17/884,609

(22) Filed: Aug. 10, 2022

(65) Prior Publication Data

US 2023/0079849 A1 Mar. 16, 2023

(30) Foreign Application Priority Data

Sep. 10, 2021 (JP) .................. 2021-147256

(51) Int. Cl.
| | | |
|---|---|---|
| *G06K 15/12* | (2006.01) | |
| *G06K 15/00* | (2006.01) | |
| *G03G 15/01* | (2006.01) | |
| *G06K 15/02* | (2006.01) | |

(52) U.S. Cl.
CPC ......... *G06K 15/1276* (2013.01); *G03G 15/01* (2013.01); *G06K 15/027* (2013.01); *G06K 15/408* (2013.01)

(58) Field of Classification Search
CPC ................................................ G06K 15/1276
USPC ........................................................ 358/1.4
See application file for complete search history.

(56) References Cited

U.S. PATENT DOCUMENTS

2018/0048788 A1* 2/2018 Hayashi ............... H04N 1/6033

FOREIGN PATENT DOCUMENTS

| JP | 2007322722 A | 12/2007 |
|---|---|---|
| JP | 2009031739 A | 2/2009 |
| JP | 2010102168 A | 5/2010 |
| JP | 2012208154 A | 10/2012 |

* cited by examiner

*Primary Examiner* — Jacky X Zheng
(74) *Attorney, Agent, or Firm* — BUCHANAN INGERSOLL & ROONEY PC

(57) ABSTRACT

An image forming apparatus forms a color image on a recording medium by superimposing images of colors formed by image forming units. The apparatus includes a processor that: acquires a read image by reading the recording medium on which the color image has been formed; forms a register patch outside a job image forming region of the recording medium; and corrects image forming positions of the image forming units based on the read image that includes the register patch. The register patch includes: a leading end patch and a rear end patch formed with a reference color material; and one or more measurement target color patches formed with measurement target color materials between the leading end patch and the rear end patch. The hardware processor corrects the image forming positions based on relative positions of the leading end patch, the rear end patch, and the measurement target color patches.

13 Claims, 15 Drawing Sheets

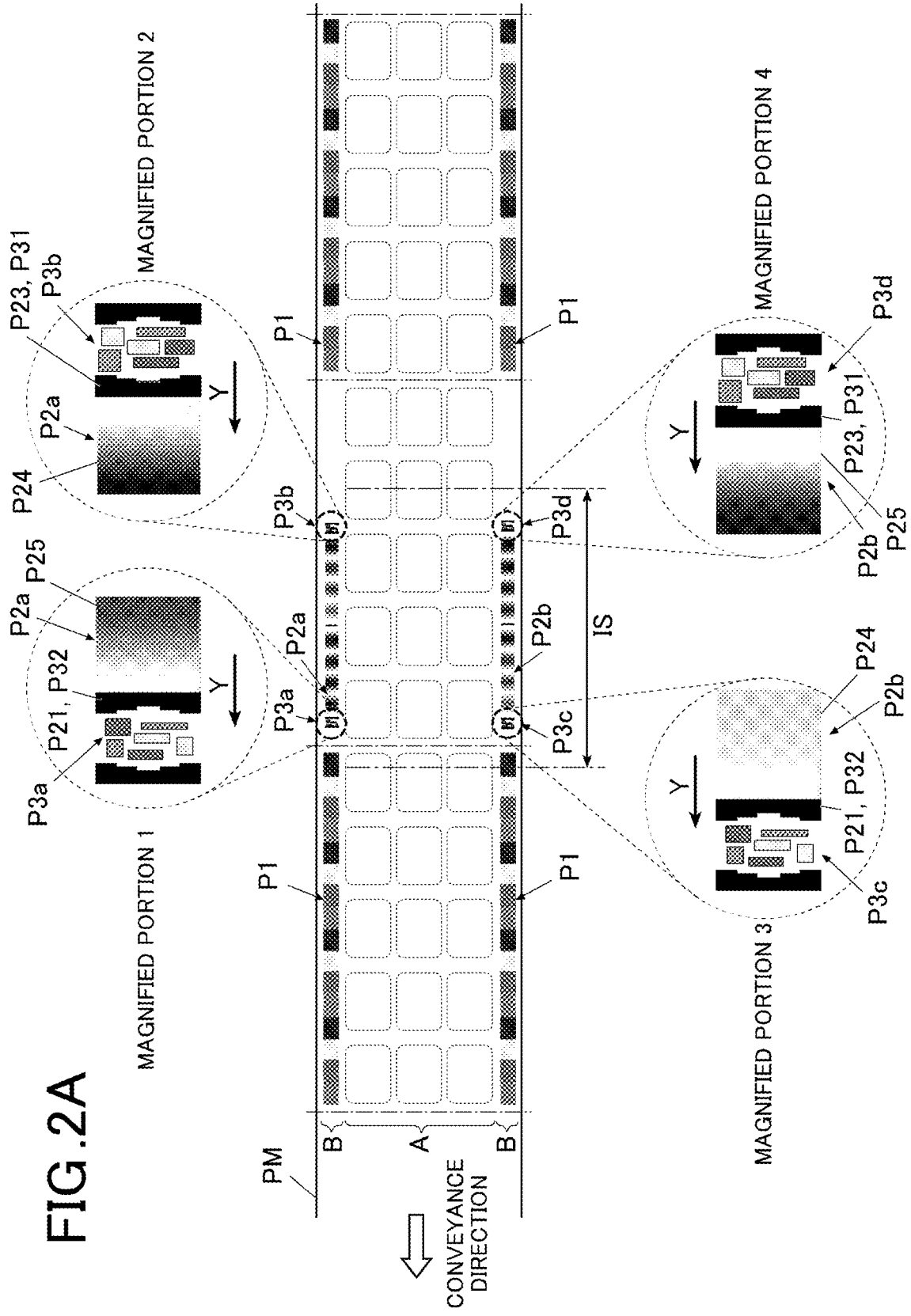

IMAGE FORMING APPARATUS AND STORAGE MEDIUM

CROSS-REFERENCE TO RELATED APPLICATIONS

The entire disclosure of Japanese Patent Application No. 2021-147256 filed on Sep. 10, 2021 is incorporated herein by reference in its entirety.

BACKGROUND

Technological Field

The present invention relates to an image forming apparatus and a storage medium.

Description of the Related Art

A conventionally-known electrophotographic image forming apparatus develops with toner a latent electrostatic image formed on a photoconductor to form a toner image, transfers the formed toner image to an intermediate transfer body (primary transfer), transfers the toner image transferred to the intermediate transfer body to a paper sheet (secondary transfer), and applies heat and pressure to the paper sheet, thereby forming an image on the paper sheet. A color image forming apparatus is required to use toner of a plurality of colors, and correctly superimpose, on the intermediate transfer body, toner images formed by photoconductors of the respective colors.

However, in such an image forming apparatus, a temperature rise of the apparatus due to continuous operation, for example, causes an increase in conveyance speed of the intermediate transfer body, for example. This may cause misregistration of a transfer position of the toner images on a paper sheet, and color misregistration.

In this respect, JP 2012-208154 A describes an image forming apparatus that in a case of performing main scanning correction processing as color registration correction, sets a secondary transfer unit in a pressed state, and in a case of performing image position correction for another element different from a main scanning direction as the color registration correction, sets the secondary transfer unit in a separate state.

JP 2009-31739 A describes an image forming apparatus that based on a variation cycle of color misregistration calculated based on revolving distances of an intermediate transfer body and each photoconductor drum, changes the interval at which paper sheets are conveyed, and changes positions of register marks for detecting color misregistration and a transfer paper region in which images are to be formed.

JP 2007-322722 A describes an image forming apparatus that reads a formed color register mark, and based on the intervals between a reference color mark and marks of other colors, calculates an amount of correction to perform correction.

JP 2010-102168 A describes a color image forming apparatus that is capable of detecting register marks even during image formation, and further, even in a case in which a printing ratio when the register marks are detected and a printing ratio when registration correction is performed are different, capable of performing registration correction with high accuracy.

SUMMARY

An image of a color register mark (patch) for performing color misregistration correction (color registration correction) is required to be formed in a smaller size because a larger size limits a region in which an image can be formed.

However, the inventions described in JP 2012-208154 A, JP 2009-31739 A, JP 2007-322722 A, and JP 2010-102168 A fail to describe specific measures for reducing the patch size.

The present invention was made in view of such problems, and has an object to provide an image forming apparatus and a program that form patches for performing color misregistration correction on a paper sheet in a smaller size, and perform color misregistration correction.

To achieve at least one of the abovementioned objects, according to an aspect of the present invention, there is provided an image forming apparatus including a plurality of image forming units that form images with color materials based on image data, the image forming apparatus forming, on a recording medium, a color image by superimposing the images of respective colors formed by the respective image forming units, the image forming apparatus including a hardware processor that acquires a read image obtained by reading an image forming surface of the recording medium on which the color image has been formed; causes a register patch to be formed outside a job image forming region of the recording medium; and corrects image forming positions of the image forming units based on the acquired read image that includes the register patch, wherein the register patch includes a leading end patch and a rear end patch formed with a reference color material at a predetermined interval in a sub scanning direction and one or more measurement target color patches formed with color materials of respective measurement target colors between the leading end patch and the rear end patch, wherein the hardware processor corrects the image forming positions based on relative positions of the leading end patch, the rear end patch, and the one or more measurement target color patches.

According to another aspect of the present invention, there is provided a computer-readable non-transitory storage medium storing a program for a computer of an image forming apparatus that includes a plurality of image forming units for forming images with color materials based on image data and that forms, on a recording medium, a color image by superimposing the images of respective colors formed by the respective image forming units, the program causing the computer to:

acquire a read image obtained by reading an image forming surface of the recording medium on which the color image has been formed; form a register patch outside a job image forming region of the recording medium; and correct image forming positions of the plurality of image forming units based on the acquired read image that includes the register patch, wherein the register patch includes a leading end patch and a rear end patch formed of a color material of a reference color at a predetermined interval in a sub scanning direction and one or more measurement target color patches formed of color materials of respective measurement target colors between the leading end patch and the rear end patch, wherein the computer corrects the image forming positions based on relative positions of the leading end patch, the rear end patch, and the one or more measurement target color patches.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention, wherein:

FIG. 2A is a diagram showing an example of a recording medium on which images of a job and images of patches have been formed according to the first embodiment;

DETAILED DESCRIPTION OF THE EMBODIMENTS

Hereinafter, embodiments of the present invention will be described in detail based on the drawings. However, the scope of the invention is not limited to the illustrated examples.

First Embodiment

Configuration of Image Forming Apparatus

First, a configuration of an image forming apparatus 100 according to an embodiment of the present invention will be described.

Figure 1:
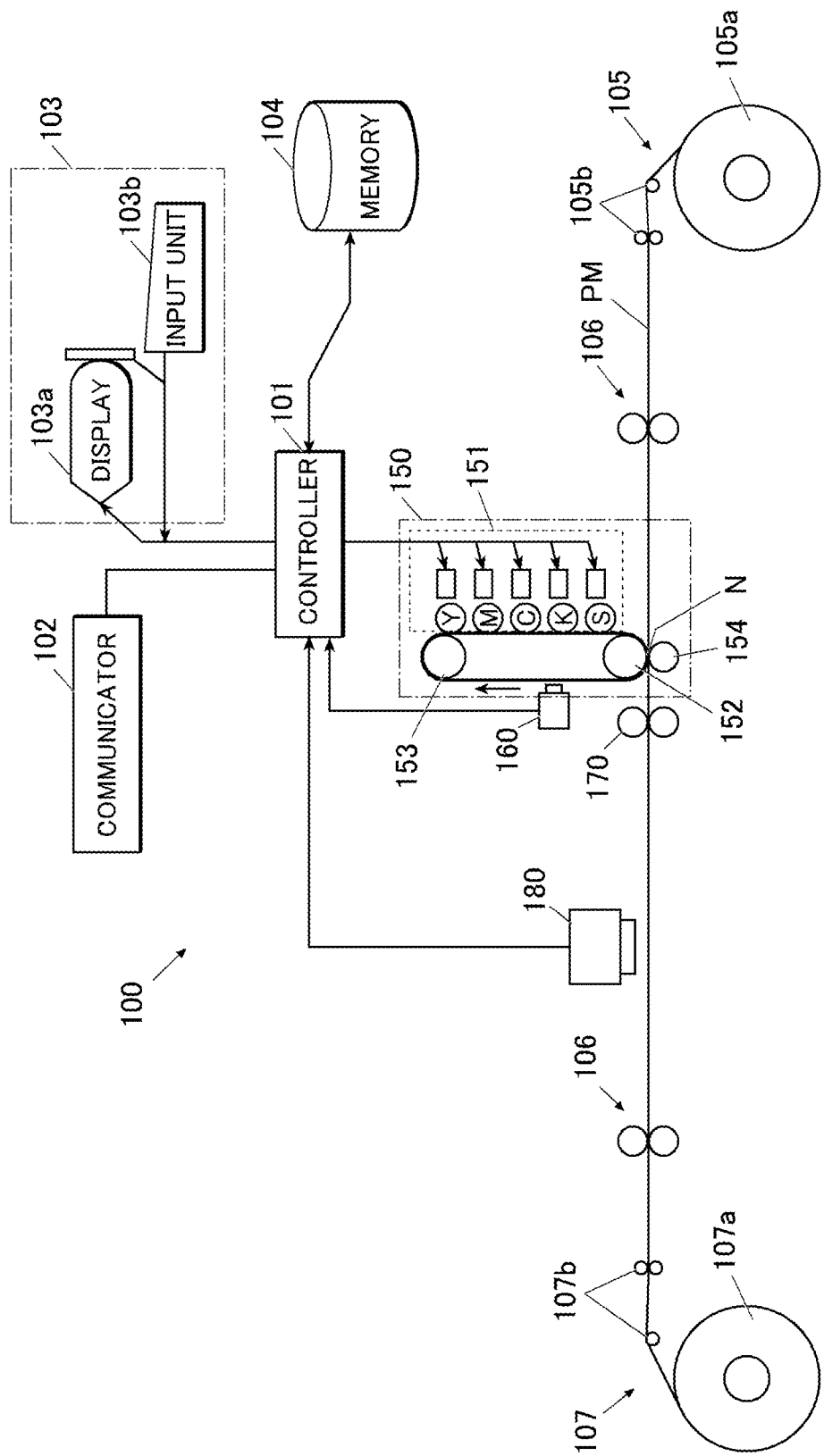
FIG. 1 is a block diagram showing a configuration of an image forming apparatus according to a first embodiment.

FIG. 1 is a diagram showing a major configuration of the image forming apparatus 100. As shown in FIG. 1, the image forming apparatus 100 is an apparatus that successively forms images on a roll-shaped recording medium PM.

As shown in FIG. 1, the image forming apparatus 100 includes a controller 101 (hardware processor), a communicator 102, an operation display 103, a memory 104, a paper feeder 105, a conveyor 106, a wind-up section 107, an image forming section 150, a second image scanner 160 which is a detector, a fixing unit 170, a first image scanner 180 which is a reader, and the like.

The controller 101 includes a CPU (Central Processing Unit), a ROM (Read Only Memory), a RAM (Random Access Memory), and the like. The CPU of the controller 101 reads a program in accordance with processing content from the ROM, loads the program into the RAM, and cooperates with the loaded program to exert centralized control over operation of each unit of the image forming apparatus 100.

The communicator 102 is implemented by a communication control card such as a LAN (Local Area Network) card, for example, and transmits/receives various kinds of data to/from external equipment connected to a communication network such as a LAN or a WAN (Wide Area Network).

The operation display 103 includes a display 103a such as a liquid crystal display or an organic EL display, various operation keys, and an input unit 103b composed of a touch panel, numeric keys, and the like arranged in a manner superimposed on a screen of the display 103a. The operation display 103 causes the display 103a to display various kinds of information, and converts an input operation made by a user on the input unit 103b into an operation signal for output to the controller 101.

The memory 104 is implemented by a non-volatile semi-conductor memory (what is called a flash memory), a hard disk drive, or the like, for example. The memory 104 stores various kinds of data including various kinds of setting information related to the image forming apparatus 100, job information (setting information for a job and image data for the job), and the like.

The memory 104 also stores image data on a toner consumption patch P1, image data on a gradation patch P2, and image data on a register patch P3 which will be described later.

The memory 104 also stores a pre job registration reference value having been set in pre job reference value setting processing which will be described later.

The memory 104 also stores a during-job registration reference value having been set in first registration correction processing after image formation is started, which will be described later.

The paper feeder 105 has a paper feed roll 105a, a paper feed roller 105b, and the like. The paper feed roll 105a has a continuous recording medium PM such as a roll-shaped film, rolled paper, or cloth, for example, wound therearound. The paper feed roll 105a rotates at a speed in accordance with a conveyance speed of the recording medium PM in response to an instruction from the controller 101 to deliver the recording medium PM to a conveyance path. The paper feed roller 105b delivers the recording medium PM toward the image forming section 150 while stretching the recording medium PM with an appropriate tensile force. The recording medium PM may not be a windable continuous medium. In that case, stacked individual recording media PM may sequentially be delivered and discharged.

The conveyor 106 has the conveyance path and a plurality of conveyance roller pairs including a register roller pair, and conveys the recording medium PM fed by the paper feeder 105 in the image forming apparatus 100.

The wind-up section 107 has a wind-up roll 107a, a wind-up roller 107b, and the like. The wind-up roller 107b delivers the recording medium PM on which an image has been formed toward the wind-up roll 107a. The wind-up roll 107a rotates at a speed in accordance with the conveyance speed of the recording medium PM in response to an instruction from the controller 101 to wind up the recording medium PM on which an image has been formed.

The image forming section 150 prints an image on the recording medium PM based on setting information for a job and image data to generate a printed matter.

The image forming section 150 includes image forming units 151, a roller 152, an intermediate transfer belt 153 which is an intermediate transfer body, a secondary transfer roller 154, and the like.

In the present embodiment, the image forming section 150 has the image forming units 151 for respective colors of Y (yellow), M (magenta), C (cyan), K (black), and S (a spot color; in the present embodiment, white), and is capable of printing through use of white toner in addition to printing of an image through use of typical toner of Y, M, C, and K.

In the image forming section 150, toner images of the respective colors are formed by the image forming units 151, and are primarily transferred in sequence to the intermediate transfer belt 153, so that the toner images of the five colors are superimposed on one another. The intermediate transfer belt 153 is an endless belt wound on a plurality of rollers, and rotates in a direction indicated by an arrow in FIG. 1 in accordance with rotation of the respective rollers.

The secondary transfer roller 154 transfers the toner images on the intermediate transfer belt 153 onto the recording medium PM fed from the paper feeder 105. In detail, the recording medium PM and the intermediate transfer belt 153 are held at a transfer nip part N formed by the secondary transfer roller 154 being pressed against the roller 152, and a predetermined transfer voltage is applied to the secondary transfer roller 154. This causes toner that forms the toner images on the secondary transfer roller 154 to be drawn to the recording medium PM side and transferred to the recording medium PM, so that an image is formed (printed). The roller 152 and the secondary transfer roller 154 constitute a transfer unit.

The secondary transfer roller 154 is configured to be separable from the roller 152.

In the pre job reference value setting processing which will be described later, the secondary transfer roller 154 is separated from the roller 152, and the toner images on the intermediate transfer belt 153 are conveyed without being transferred to the recording medium PM. In this case, the second image scanner 160 detects the toner images conveyed without being transferred to the recording medium PM downstream of the transfer nip part N.

The second image scanner 160 outputs a detection result to the controller 101.

After being detected by the second image scanner 160, the toner images are removed from the intermediate transfer belt by a cleaner not shown.

The second image scanner 160 is implemented by a color scanner or the like, for example.

The fixing unit 170 fixes toner images printed on the recording medium PM to the recording medium PM by means of heat and pressure.

Although FIG. 1 illustrates the image forming section 150 as what is called an electrophotographic image forming section, the printing method is not limited thereto. An image forming section according to another printing method such as an inkjet method in which a temperature rise in the image forming apparatus 100 causes an image forming position to be shifted, for example.

The first image scanner 180 outputs read image data (a read image) obtained by reading an image forming plane of the recording medium PM printed by the image forming section 150 and fixed by the fixing unit 170, to the controller 101. The first image scanner 180 is implemented by a color scanner or the like, for example. The first image scanner 180 is arranged on the downstream side of the fixing unit 170, and configured to read an image while the recording medium PM is being conveyed.

The controller 101 acquires the read image obtained by reading the image forming plane of the recording medium PM on which color images have been formed. The controller 101 here functions as an acquirer.

The controller 101 controls the image forming section 150 to cause images of the register patch P3 to be formed outside a job image forming region of the recording medium PM which will be described later. The controller 101 here functions as a controller.

The controller 101 corrects an image forming position in the plurality of image forming units 151 based on the read image including the register patch P3 read by the first image scanner 180. The controller 101 here functions as a corrector.

The controller 101 sets a reference value (a pre job registration reference value) for the image forming positions in the plurality of image forming units 151 based on the detection result obtained by the second image scanner 160. The controller 101 here functions as a setter.

The controller 101 identifies the type of the gradation patch P2 depending on the form of each of measurement target color patches which will be described later. The controller 101 here functions as an identifier.

The toner consumption patch P1, the gradation patch P2, and the register patch P3, images of which are formed on the recording medium PM by the controller 101 controlling the image forming section 150, will now be described.

FIG. 2A is a diagram showing an example of the recording medium PM on which images of a job and images of the toner consumption patch P1, gradation patches P2a and P2b (in a case of not distinguishing between the gradation patches P2a and P2b, hereinafter described as a gradation patch P2) for correcting gradation of density in an image to be formed, and images of register patches P3a to P3d (in a case of not distinguishing among the register patches P3a to P3d, hereinafter described as a register patch P3) have been formed.

In the example shown in FIG. 2A, a region A is the job image forming region in which images of a job are to be formed. A region B is located outside the job image forming region on both the outer sides of the job image forming region in the main scanning direction, and is a region in which images of the toner consumption patch P1, the gradation patch P2, and the register patch P3 are to be formed. By forming images of the toner consumption patch P1, the gradation patch P2, and the register patch P3 in the region B, a wider region is ensured for the region A which is the job image forming region.

The toner consumption patch P1 is a patch for consuming old toner in a case of printing a job that consumes less toner.

Figure 2B:
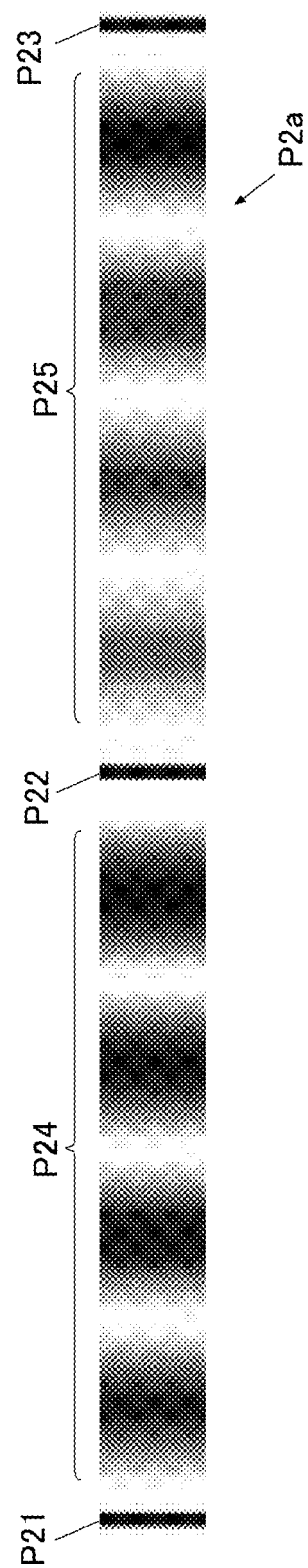
FIG. 2B is a diagram showing an example of a gradation patch according to the first embodiment.

FIG. 2B shows the gradation patch P2a. The gradation patch P2a has a boundary line P21 which indicates a leading end of the gradation patch P2 in a direction in which the recording medium PM is conveyed, and is a detection mark for detecting the gradation patch P2a, a boundary line P22 indicating a boundary between a first gradation patch portion P25 and a second gradation patch portion P24, a boundary line P23 which indicates a rear end of the gradation patch P2 in the direction in which the recording medium PM is conveyed, and is a detection mark for detecting the gradation patch P2a, the first gradation patch portion P25, and the second gradation patch portion P24.

The first gradation patch portion P25 includes a plurality of gradation patches of respective colors in which gradation values of Y, M, C, and K are made different stepwise.

The second gradation patch portion P24 includes a plurality of gradation patches of respective colors in which gradation values of secondary colors or tertiary colors composed of toner of a plurality of colors among Y, M, C, and K are made different stepwise.

Figure 2C:
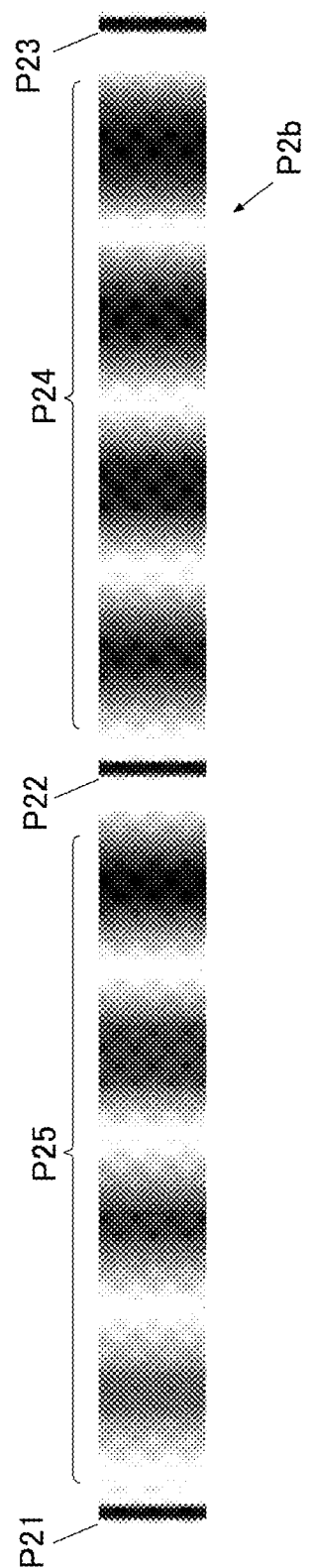
FIG. 2C is a diagram showing an example of a gradation patch according to the first embodiment.

FIG. 2C shows the gradation patch P2b. The gradation patch P2b has the boundary lines P21 to P23, the first gradation patch portion P25, and the second gradation patch portion P24 similarly to the gradation patch 2a, but is configured such that the first gradation patch portion P25 and the second gradation patch portion P24 are reversed in position from those of the gradation patch P2a, with the interposition of the boundary line P22.

Figure 2D:
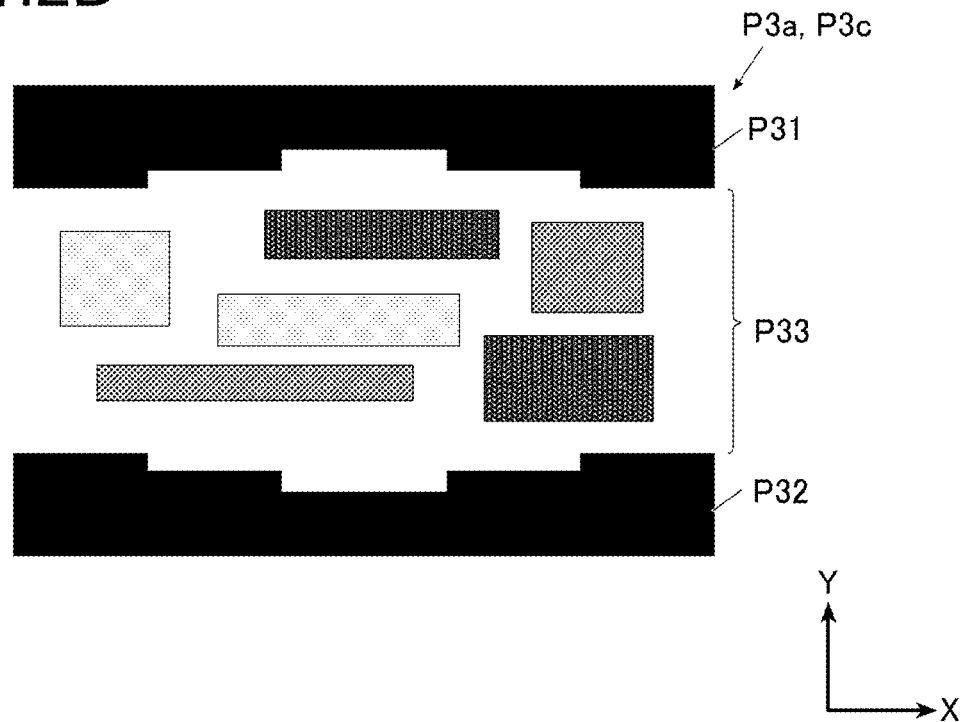
FIG. 2D is a diagram showing an example of a register patch according to the first embodiment.
Figure 2E:
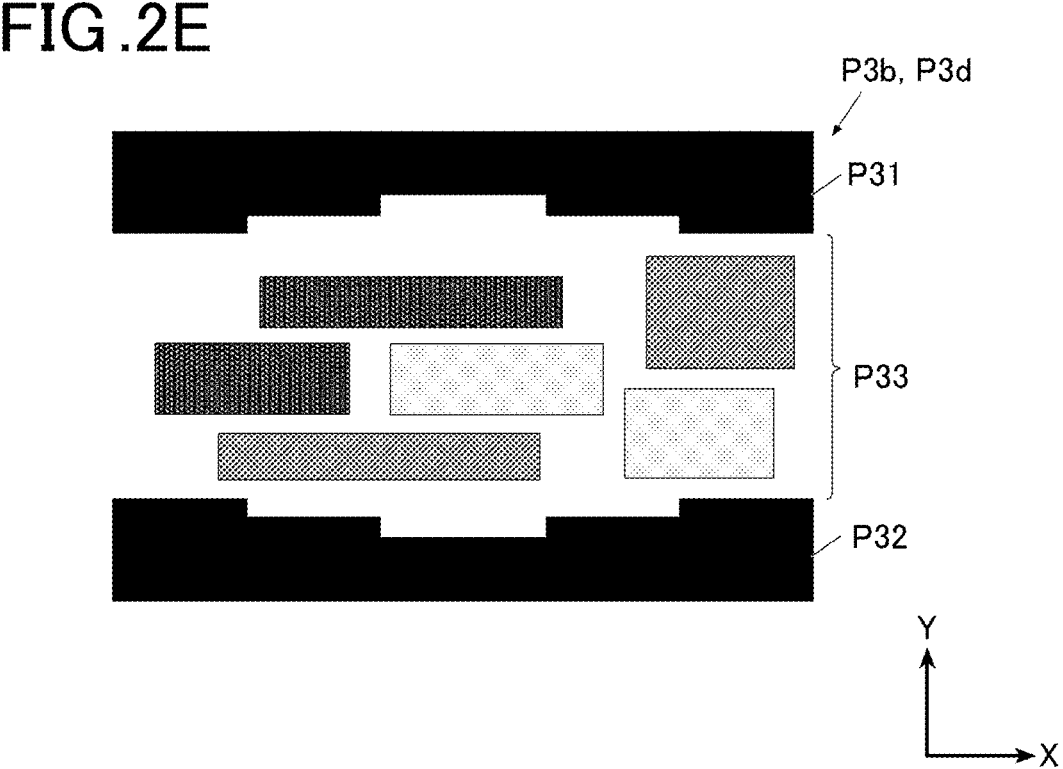
FIG. 2E is a diagram showing an example of the register patch according to the first embodiment.

FIG. 2D shows identical register patches P3a and P3c. FIG. 2E shows identical register patches P3b and P3d.

The register patch P3 has reference color patches P31 and P32 (a leading end patch and a rear end patch) formed of a color material of a reference color at a predetermined interval in a sub scanning direction, and a measurement target color patch portion P33. The measurement target color patch portion P33 is arranged to be sandwiched between the reference color patches P31 and P32. Herein, the reference color is K, for example, and measurement target colors are Y, M, and C.

The measurement target color patch portion P33 has at least one patch for each of the measurement target colors. In the examples shown in FIG. 2D and FIG. 2E, the measurement target color patch portion P33 has two patches for each of the measurement target colors. In a case in which a single patch is provided for each of the measurement target colors, calculation of a correction value in registration correction processing which will be described later may have low accuracy. Thus, two or more patches are preferably provided for each of the measurement target colors. In a case in which an excessively large number of patches are provided for each of the measurement target colors, it may be impossible to distinguish between the patches and noise in the registration correction processing. Thus, the number of patches for each of the measurement target colors is preferably in such a degree that the patches and noise can be distinguished from each other.

The respective patches that the measurement target color patch portion P33 has are different in size and form from one another.

It is configured such that the positions of patch ends of the respective patches that the measurement target color patch portion P33 has are different in each of an X-axis (main scanning) and a Y-axis (sub scanning) directions shown in FIG. 2D and FIG. 2E.

In a case in which color misregistration occurs in the measurement target color patch portion P33 in the register patch P3 configured in this manner, the color misregistration is less noticeable, and a user is less likely to notice the occurrence of the color misregistration. Thus, when color misregistration in a non-defective product level occurs, the user is prevented from recognizing the occurrence of the color misregistration.

In each of the patches that the measurement target color patch portion P33 has, the interval between patch ends of patches of an identical color is a distance which is not an integral multiple of a reading resolution of the first image scanner 180 at least in the Y-axis direction. Sides of the reference color patches P31 and P32 closer to the measurement target color patch portion P33 are provided with differences in level smaller than the reading resolution of the first image scanner 180 in the Y-axis direction. This improves an interpolation resolution and enables the register patch P3 to be correctly read even in a case in which the reading resolution of the first image scanner 180 is not sufficient for reading the register patch P3.

A minimum linewidth in the reference color patches P31, P32 and the measurement target color patch portion P33 is more than or equal to ten pixels at 600 dpi (dots per inch). This enables the first image scanner 180 to correctly read the contour of each of the reference color patches P31, P32 and the measurement target color patch portion P33 even in a case in which image forming properties of the image forming section 150 are changed by an environmental change or the like. The above-described minimum linewidth indicates a preferable example based on printing properties of the typical electrophotographic method, and is appropriately set in accordance with properties of various image forming apparatuses, the size of a region (image forming region) usable for forming images of the register patch P3, and the like. For example, in a case in which a recording medium has rough surface quality as in textile printing, the minimum linewidth is preferably set at a larger value. In a case of performing printing with an image forming apparatus intended for fine printing for artistic photo book application or the like, the minimum linewidth may be set at a smaller value. The upper limit of the minimum linewidth is not particularly required, and should be set as appropriate to fall within a range that falls within the image forming region of the register patch P3 in design.

Referring again to FIG. 2A, magnified portions 1 to 4 will be described.

The register patch P3a and the gradation patch P2a are partially shown in the magnified portion 1. The register patch P3a is arranged such that the upward direction of the Y-axis shown in FIG. 2D conforms to the direction in which the recording medium PM is conveyed. The reference color patch P32 and the boundary line P21 are arranged to be superimposed on each other.

The register patch P3b and the gradation patch P2a are partially shown in the magnified portion 2. The register patch P3b is arranged such that the upward direction of the Y-axis shown in FIG. 2E conforms to the direction in which the recording medium PM is conveyed. The reference color patch P31 and the boundary line P23 are arranged to be superimposed on each other.

The register patch P3c and the gradation patch P2b are partially shown in the magnified portion 3. The register patch P3c is arranged such that the upward direction of the Y-axis shown in FIG. 2D conforms to the direction in which the recording medium PM is conveyed. The reference color patch P32 and the boundary line P21 are arranged to be superimposed on each other.

The register patch P3d and the gradation patch P2b are partially shown in the magnified portion 4. The register patch P3d is arranged such that the upward direction of the Y-axis shown in FIG. 2E conforms to the direction in which the recording medium PM is conveyed. The reference color patch P31 and the boundary line P23 are arranged to be superimposed on each other.

In other words, the reference color patches P31 and P32 also serve as detection marks in the gradation patches. The orientation of the Y-axis direction of the register patch P3 may be opposite to the orientation shown in FIG. 2A.

By arranging the reference color patch P31 and the boundary line P23 to be superimposed on each other and arranging the reference color patch P32 and the boundary line P21 to be superimposed on each other in this manner, the region in which images of the gradation patch P2 and the register patch P3 are to be formed is made smaller.

By arranging the identical register patches P3a and P3c on the leading end side of the gradation patch P2 in the direction in which the recording medium PM is conveyed and arranging the identical register patches P3b and P3d on the rear end side of the gradation patch P2 in the direction in which the recording medium PM is conveyed in this manner, the controller 101 identifies the leading end side and the rear end side of the gradation patch P2 in the direction in which the recording medium PM is conveyed based on the read image including the register patch P3.

A section IS in FIG. 2A indicates a reading range of the first image scanner 180. As shown in FIG. 2A, images of the gradation patch P2 and the register patch P3 are formed on the recording medium PM within a range that reliably falls within the section IS.

Operation of Image Forming Apparatus

Next, an operation in the image forming apparatus 100 will be described.

Figure 3:
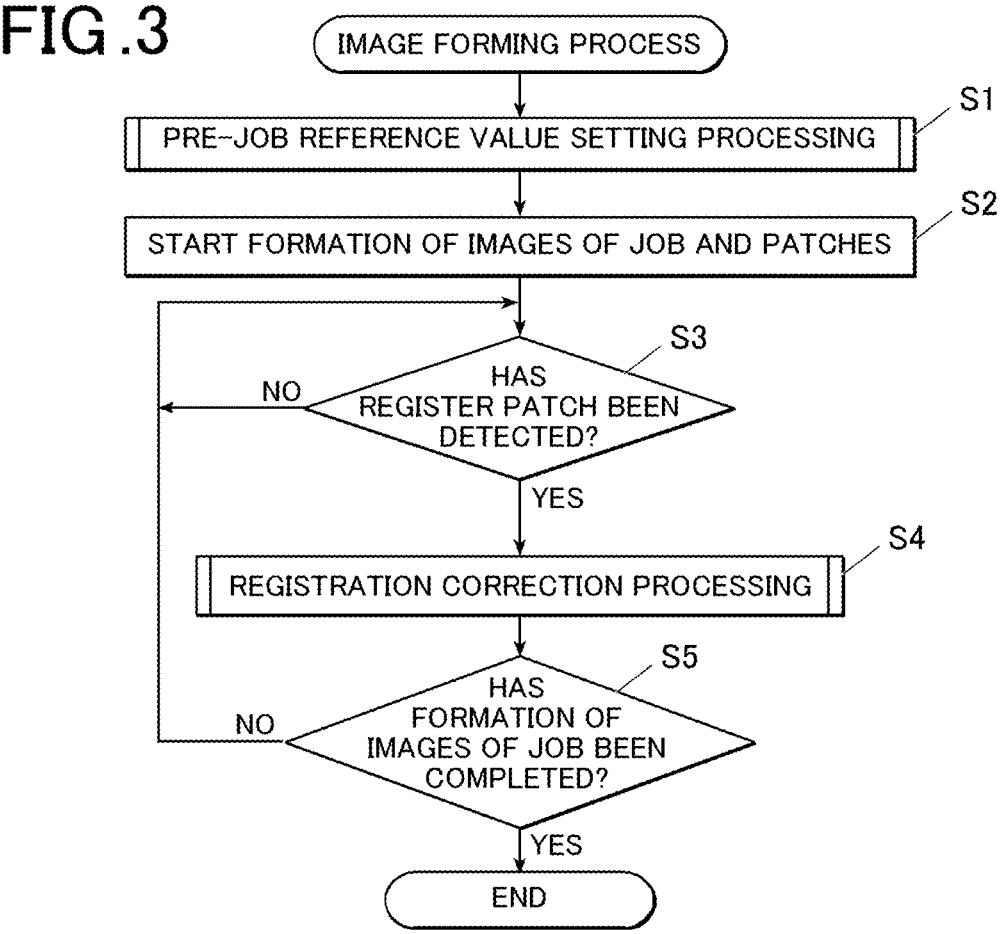
FIG. 3 is a flowchart showing a flow of an image forming process according to the first embodiment.

FIG. 3 shows a flowchart of an image forming process executed by the image forming apparatus 100. The image forming process is executed by a program stored in the controller 101 of the image forming apparatus 100.

In the image forming process, the controller 101 first executes pre job reference value setting processing (step S1).

Figure 4:
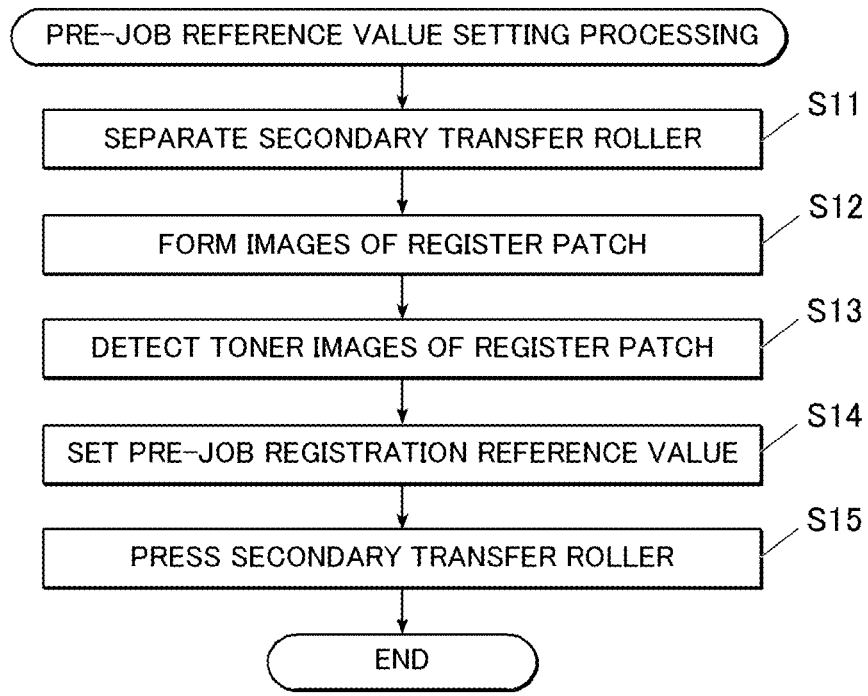
FIG. 4 is a flowchart showing a flow of pre job reference value setting processing according to the first embodiment.

FIG. 4 shows a flowchart of the pre job reference value setting processing.

In the pre job reference value setting processing, the controller 101 first separates the secondary transfer roller 154 from the roller 152 (step S11).

Next, the controller 101 acquires image data on the register patch P3 from the memory 104, controls the image forming section 150 to form images of the register patch P3 (step S12), and conveys toner images of the register patch P3, the images of which have been formed on the intermediate transfer belt 153.

Next, the controller 101 controls the second image scanner 160 to detect the toner images of the register patch P3, and receives a detection result (step S13).

Next, the controller 101 causes the memory 104 to store the detection result received in step S13 as the pre job registration reference value, thereby setting the pre job registration reference value (step S14).

Next, the controller 101 presses the secondary transfer roller 154 against the roller 152 (step S15), and terminates the present processing.

The pre-job registration reference value may be set using, instead of the second image scanner 160, a reflective optical sensor including a light emitting device such as a light emitting diode and a light receiving device such as a photodiode and forming an image of a patch that is detectable with the optical sensor instead of the register patch P3.

The image forming process shown in FIG. 3 will be described again.

Next, the controller 101 acquires image data on a job, image data on the toner consumption patch P1, image data on the gradation patch P2, and image data on the register patch P3 from the memory 104, and controls the image forming section 150 to form images of the job and images of the respective patches on the recording medium PM (step S2).

Next, the controller 101 determines whether the register patch P3 has been detected based on the read image on the recording medium PM read by the first image scanner 180 (step S3).

In a case in which the register patch P3 has not been detected (NO in step S3), the controller 101 advances the present process to step S3.

In a case in which the register patch P3 has been detected (YES in step S3), the controller 101 executes registration correction processing (step S4).

Figure 5:
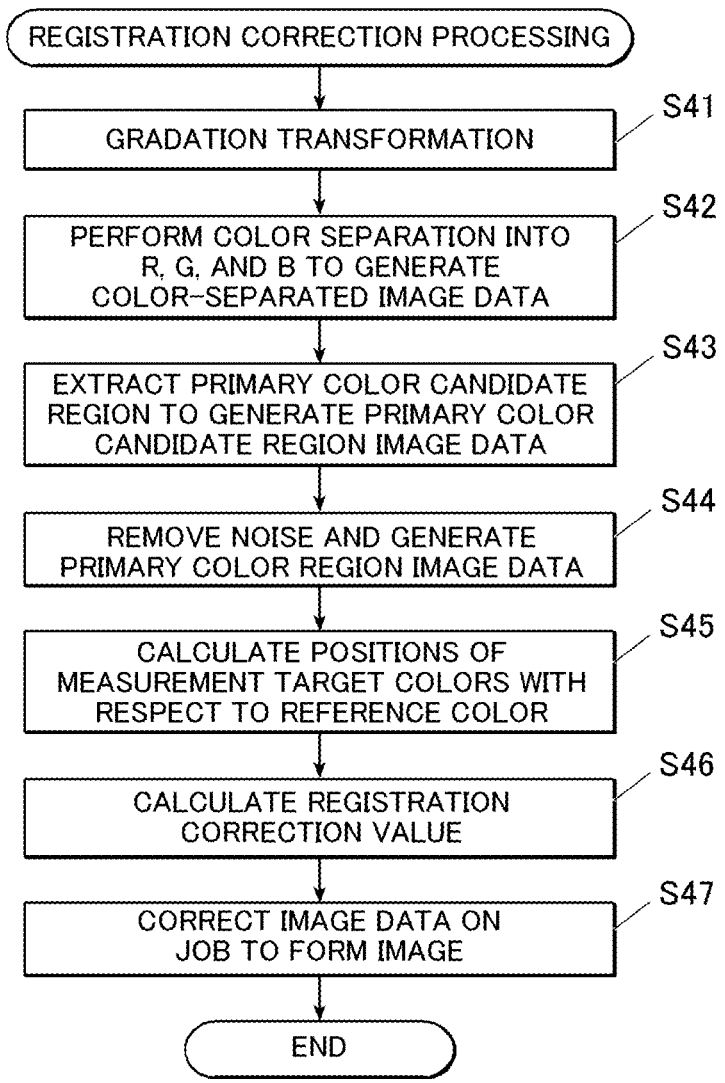
FIG. 5 is a flowchart showing a flow of registration correction processing according to the first embodiment.

FIG. 5 shows a flowchart of the registration correction processing.

Figure 6A:
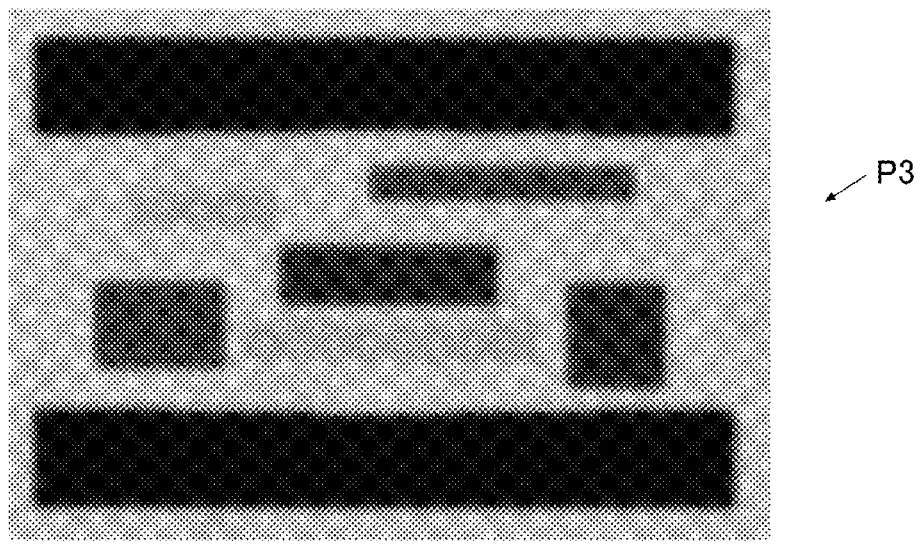
FIG. 6A is a diagram showing an example of a read image according to the first embodiment.
Figure 6B:
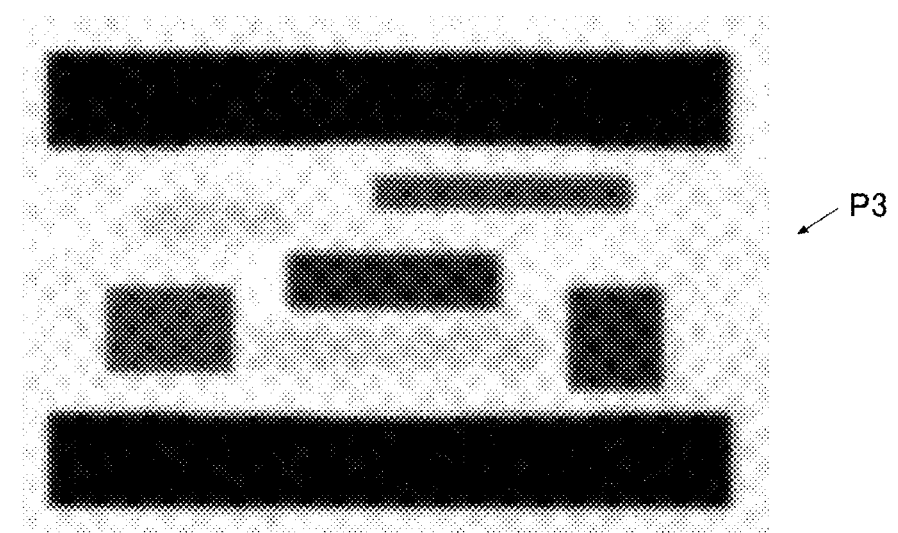
FIG. 6B is a diagram showing an example of the read image after gradation processing according to the first embodiment.

In the registration correction processing, the controller 101 first carries out gradation transformation in read image data read by the first image scanner 180 (step S41). Specifically, the controller 101 performs gradation transformation such that white, which is the color of the recording medium PM, becomes the brightest color in RGB (red, green, blue) information, and a high-density portion of the register patch P3 becomes the darkest color in the RGB information in a read image as shown in FIG. 6A. FIG. 6B shows an example of a read image having been subjected to gradation transformation.

Figure 6C:
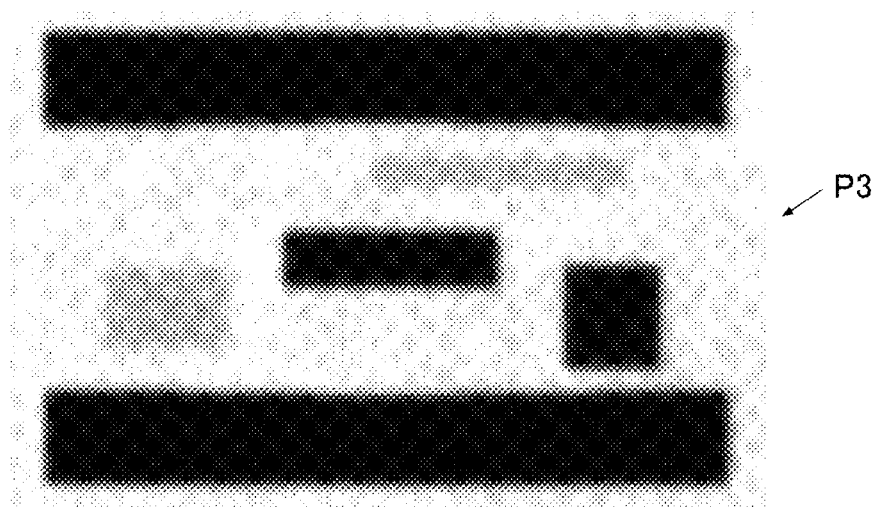
FIG. 6C is a diagram showing an example of an R color-separated image according to the first embodiment.
Figure 6D:
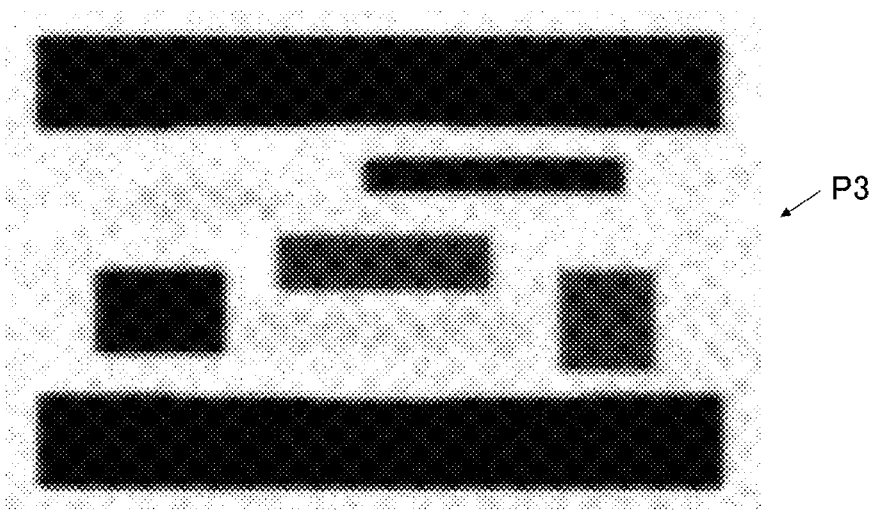
FIG. 6D is a diagram showing an example of a G color-separated image according to the first embodiment.
Figure 6E:
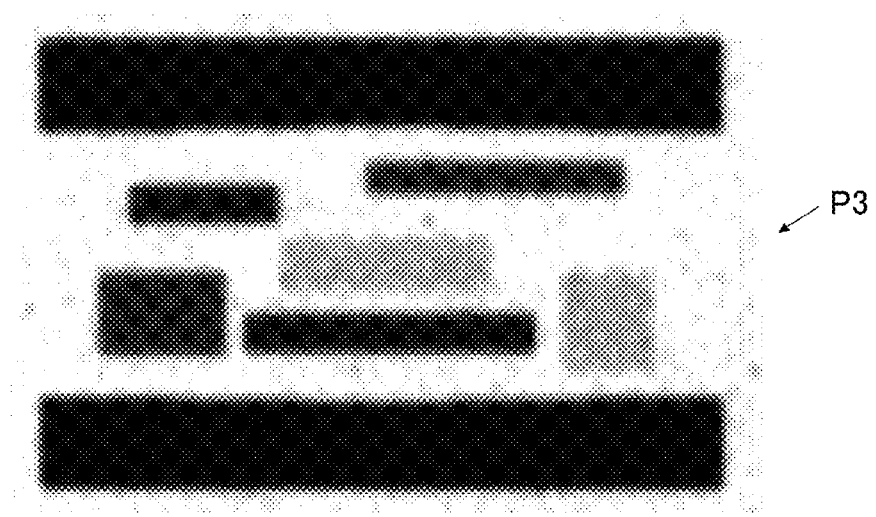
FIG. 6E is a diagram showing an example of a B color-separated image according to the first embodiment.

Next, the controller 101 subjects the read image data having been subjected to gradation transformation in step S41 to color separation for each of filters of R, G, and B to generate color-separated image data (step S42). FIG. 6C shows an R color-separated image. FIG. 6D shows a G color-separated image. FIG. 6E shows a B color-separated image.

Figure 6F:
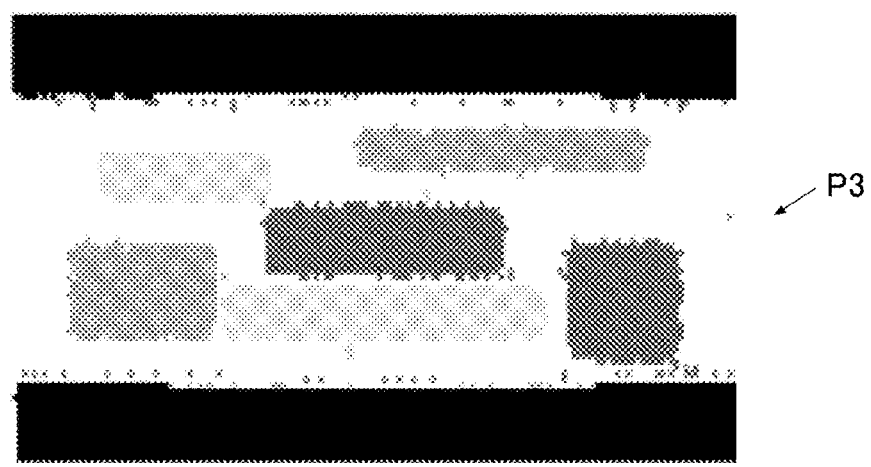
FIG. 6F is a diagram showing an example of primary color candidate region images according to the first embodiment.

Next, the controller 101 extracts a primary color candidate region from the color-separated image data generated in step S42. For example, the controller 101 extracts a region having a high density in all pieces of R, G, and B separated image data as a candidate region for K (black). The controller 101 extracts a region having a high density only in the B separated image data as a candidate region for Y (yellow). The controller 101 extracts a region having a high density only in the G separated image data as a candidate region for M (magenta). The controller 101 extracts a region having a high density only in the R separated image data as a candidate region for C (cyan). The controller 101 then generates primary color candidate region image data from respective extraction results (step S43). FIG. 6F shows an example of primary color candidate region images.

The method of generating the primary color candidate region image data is not limited to the above-described method. An image forming apparatus having toner of more colors such as six colors, for example, may have orange toner and blue toner, for example, in addition to toner of Y, M, C, and K. In this case, it may be difficult to separate toner images having similar hues merely with the standard of a high density of only a single color in the above-described RGB separated image data. In such a case, a hue angle may be calculated from the RGB separated image data to identify a toner color constituting a patch, in addition to the condition that a specific color among the above-described RGB has the highest density.

Figure 6G:
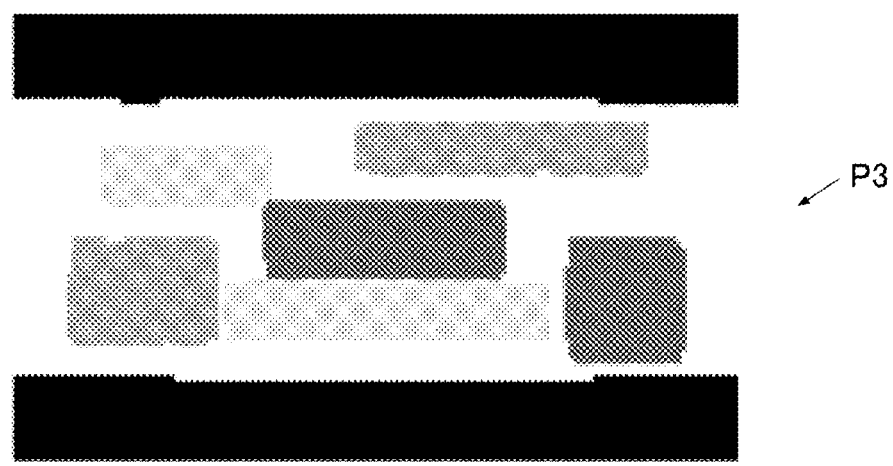
FIG. 6G is a diagram showing an example of primary color region images according to the first embodiment.

Next, the controller 101 performs morphology processing on the primary color candidate region image data generated in step S43 to remove noise and generate primary color region image data (step S44). FIG. 6G shows an example of primary color region images.

Next, the controller 101 calculates positions of patches of respective measurement target colors with respect to the positions of the reference color patches P31 and P32 of the register patch P3 in the primary color region image data generated in step S44 (step S45). Specifically, in a case in which two patches are provided for each of the measurement target colors, the controller 101 calculates the center of gravity of each of the patches, and based on the calculated centers of gravity, calculates the center of gravity of two patches of an identical color. The controller 101 also calculates the center of gravity of the reference color patches P31 and P32. The controller 101 then calculates a relative position of the center of gravity of the two patches of the identical color with respect to the center of gravity of the reference color patches P31 and P32. Herein, the controller 101 causes the memory 104 to store the calculated value as the during job registration reference value in first registration correction processing after image formation is started, thereby setting the during-job registration reference value.

Herein, the controller 101 may calculate relative positions between regions of the reference color patches P31 and P32 and the center of gravity of the two patches of the identical color. The positions of the regions of the reference color patches P31 and P32 are calculated by specifying the positions of edges of the opposed reference color patches P31 and P32 through edge extraction.

Next, the controller 101 calculates a registration correction value from a difference between the pre job registration reference value having been set in the pre job reference value setting processing and the value calculated in step S45 (step S46).

Next, the controller 101 corrects image data on the job based on the registration correction value calculated in step S46, forms images of the corrected images of the job (step S47), and terminates the present processing.

In this manner, the controller 101 corrects the image forming position based on relative positions of the leading end patch and the rear end patch (the reference color patches P31 and P32) formed of the color material of the reference color at a predetermined interval in the sub scanning direction in the register patch P3 and measurement target color patches formed of the color materials of the respective measurement target colors between the leading end patch and the rear end patch. Consequently, by sandwiching the region between the reference color patches P31 and P32 by the reference color patches P31 and P32, the region between the reference color patches P31 and P32 is specified as an analysis region for the measurement target color patches in the registration correction processing. The analysis region for the measurement target color patches in the register patch P3 thus has a minimum range necessary for an analysis (processing in the registration correction processing). This enables patches for performing color misregistration correction to be formed in a smaller size.

By carrying out an analysis such as calculation of the distance between the reference color patches P31 and P32, a magnification of images in image formation is calculated, and the accuracy of image formation in the register patch P3 is calculated. This enables whether the analysis in the registration correction processing (processing in the registration correction processing) can be carried out to be determined before the registration correction processing.

Since the centers of gravity of respective patches are calculated as the positions of the measurement target color patches, the respective patches have flexibility in form. Consequently, the forms of patches less noticeable even if color misregistration occurs are designed to be used for registration correction.

Since the layout of the measurement target color patches has flexibility, predetermined information may be added to the layout of the patches. Examples of the predetermined information include information such as information representing the type (such as identification information about a YMCK single color, an RGB3C reference intermediate color, and other intermediate colors set by the user) of the gradation patch P2 adjacent to the register patch P3. The controller 101 thereby identifies the type of the gradation patch P2 based on the read image including the register patch P3.

Figure 7:
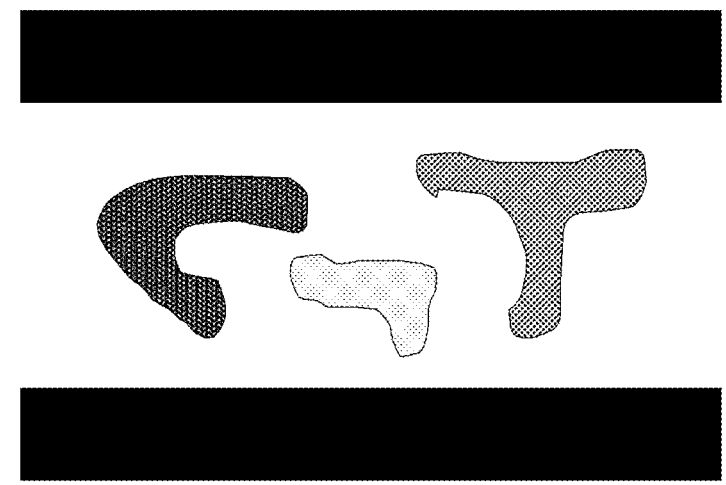
FIG. 7 is a diagram showing an example of a register patch according to the first embodiment.

FIG. 7 shows an example of the register patch P3 having patches different in form from those in FIG. 2D and FIG. 2E. In the example shown in FIG. 7, each of the measurement target color patches has a form composed of a curve rather than a rectangle as in FIG. 2D and FIG. 2E.

The image forming process shown in FIG. 3 will be described again.

Next, the controller 101 determines whether formation of images of the job has been completed (step S5).

In a case in which formation of images of the job has been completed (YES in step S5), the controller 101 terminates the present process.

In a case in which formation of images of the job has not been completed (NO in step S5), the controller 101 advances the present process to step S3.

In a case in which the register patch P3 is detected in step S3, the controller 101 executes second registration correction processing after image formation is started (step S4).

In step S46 of the second registration correction processing after image formation is started, the controller 101 adds up the difference between the pre job registration reference value and the value calculated in step S45, and the difference between the during-job registration reference value having been set in the first registration correction processing after image formation is started and the value calculated in step S45 to calculate a registration correction value. The same applies to third or subsequent registration correction processing after image formation is started.

(Modification 1)

Next, Modification 1 of the above-described first embodiment will be described.

Hereinafter, differences from the above-described first embodiment will mainly be described. The image forming apparatus 100 according to the present modification has a configuration identical to the configuration of the image forming apparatus 100 according to the above-described first embodiment.

In the image forming process according to the present modification, the controller 101 controls the image forming section 150 to form images of a job, images of the toner consumption patch P1, images of the gradation patch P2, images of the register patch P3, and images of eye marks MK on the recording medium PM. The eye marks MK are marks indicating image forming positions of the images of the job.

Figure 8:
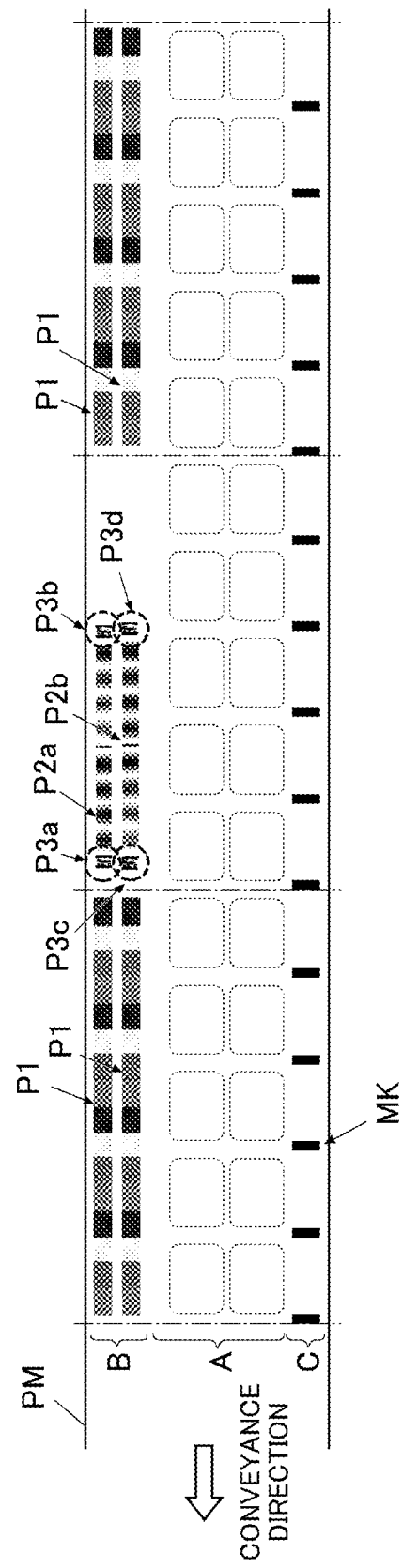
FIG. 8 is a diagram showing an example of a recording medium on which images of a job and images of patches and eye marks have been formed according to the first embodiment.

FIG. 8 is a diagram showing an example of the recording medium PM on which images of a job and images of the toner consumption patch P1, the gradation patches P2a and P2b, the register patches P3a to P3d, and the eye marks MK have been formed.

In the example shown in FIG. 8, the region A is the job image forming region in which images of a job are to be formed. The region B is located outside the job image forming region on one of the outer sides of the job image forming region in the main scanning direction, and is a region in which images of the toner consumption patch P1, the gradation patch P2, and the register patch P3 are to be formed. The region C is located outside the job image forming region on the other outer side of the job image forming region in the main scanning direction opposite to the region B, and is a region in which images of the eye marks MK are to be formed.

Also in the example shown in FIG. 8, a process similar to the image forming process according to the above-described first embodiment is performed to carry out registration correction.

(Modification 2)

Next, Modification 2 of the above-described first embodiment will be described.

Hereinafter, differences from Modification 1 of the above-described first embodiment will mainly be described. The image forming apparatus 100 according to the present modification has a configuration identical to the configuration of the image forming apparatus 100 according to the above-described first embodiment.

In the image forming process according to the present modification, the controller 101 controls the image forming section 150 to form images of a job, images of the toner consumption patch P1, images of the gradation patch P2, images of the register patch P3, and images of the register patch P3 that substitute for the eye marks on the recording medium PM.

Figure 9:
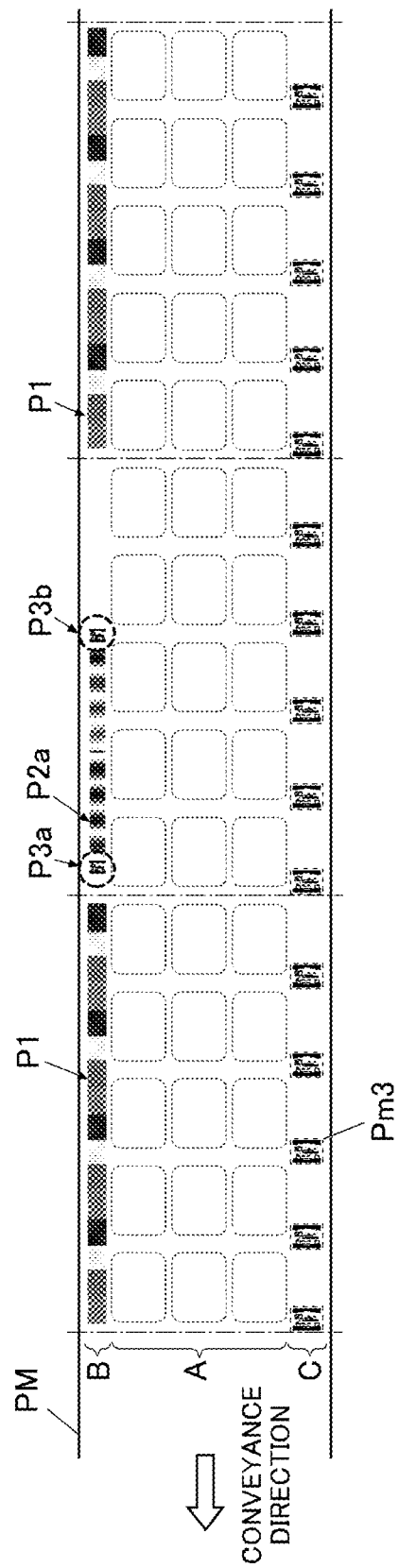
FIG. 9 is a diagram showing an example of a recording medium on which images of a job and images of patches have been formed according to the first embodiment.

FIG. 9 is a diagram showing an example of the recording medium PM on which images of a job and images of the toner consumption patch P1, the gradation patch P2a, the register patches P3a and P3b, and a register patch P3m that substitutes for the eye marks have been formed.

In the example shown in FIG. 9, the region A is a job image forming region in which images of a job are to be formed. The region B is located outside the job image forming region on one of the outer sides of the job image forming region in the main scanning direction, and is a region in which images of the toner consumption patch P1, the gradation patch P2, and register patches P3a and P3b are to be formed. The region C is located outside the job image forming region on the other outer side of the job image forming region in the main scanning direction opposite to the region B, and is a region in which images of the register patch P3m that substitute for the eye marks MK are to be formed.

Also in the example shown in FIG. 9, a process similar to the image forming process according to the above-described first embodiment is performed to carry out registration correction. In this case, the registration correction processing may be executed using the register patch P3m.

In this manner, by forming images of the register patch P3m as a substitute for the eye marks, an area in which images of various patches are to be formed is reduced, and a paper width of the recording medium PM is effectively utilized. Although only images of the register patch P3m are formed herein as a substitute for the eye marks, images of the gradation patch P2, for example, may be formed at an interval identical to the interval of the eye marks to substitute for the eye marks (Modification 3)

Next, Modification 3 of the above-described first embodiment will be described.

Hereinafter, differences from the above-described first embodiment will mainly be described. The image forming apparatus 100 according to the present modification has a configuration identical to the configuration of the image forming apparatus 100 according to the above-described first embodiment.

When images of a white S (spot color) patch are formed as the register patch P3 on the recording medium PM in order to perform registration correction in a case in which the color of the recording medium PM is white, images of the white patch are formed on the white recording medium PM. It is difficult in a read image to read a region in which the images of the white patch have been formed, so that registration correction with white toner is difficult.

Thus, in the registration correction processing according to the present modification, the controller 101 calculates a misregistration amount (correction value) of a color material (e.g., white toner) that is less detectable with respect to a predetermined standard from the pre job registration reference value, based on a misregistration amount of toner of another color from the pre job registration reference value. The predetermined standard refers to a degree that the patches are read in a read image.

Similarly to the above-described first embodiment, a registration correction value in second and subsequent registration correction processing after image formation is started is calculated by adding up the misregistration amount from the pre job registration reference value and a misregistration amount from the during-job registration reference value.

Figure 10:
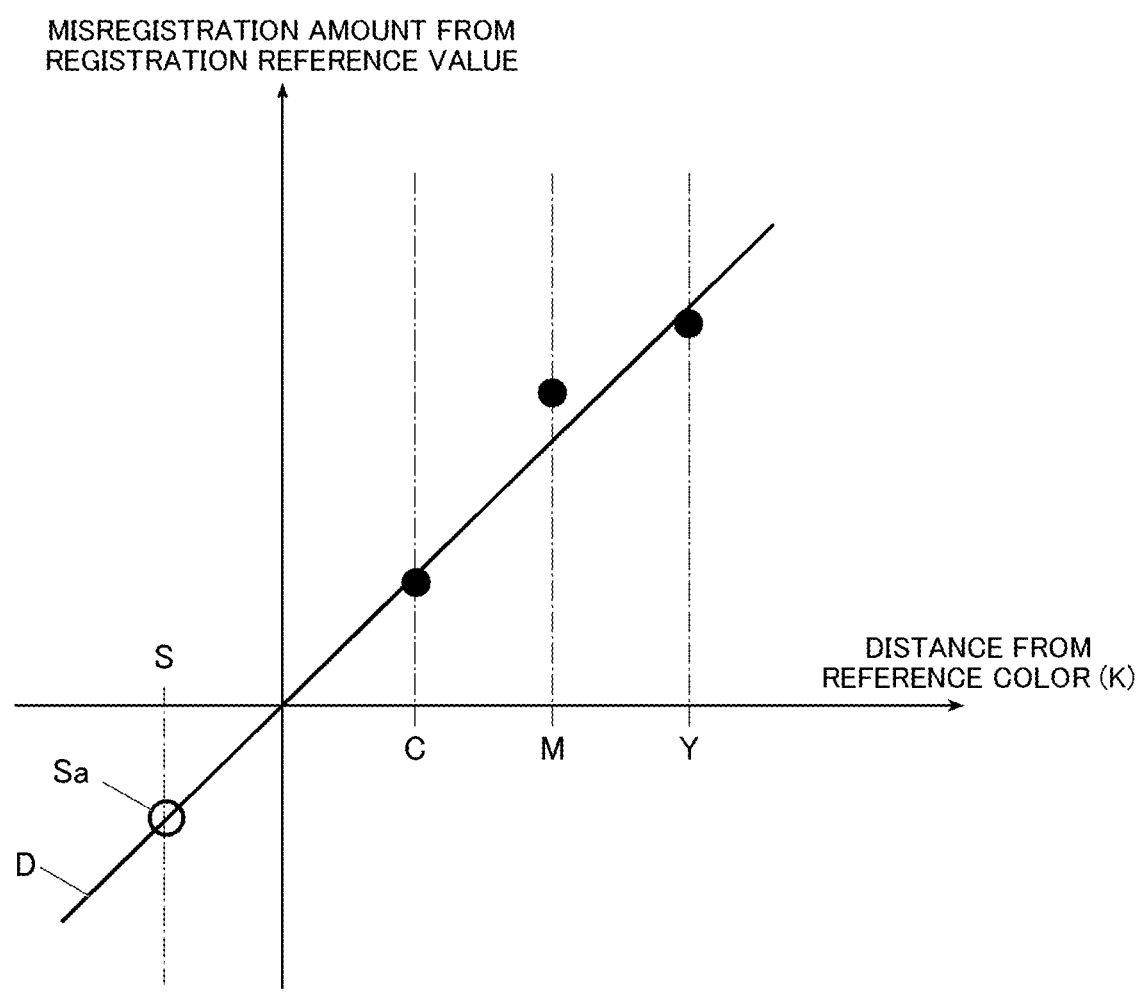
FIG. 10 is a diagram showing an example of a misregistration amount from a registration reference value in color misregistration and a regression expression thereof according to the first embodiment.

Specifically, the controller 101 calculates misregistration amounts of Y, M, and C from the pre job registration reference value (or the during job registration reference value), and calculates a regression expression D as shown in FIG. 10 based on the values. In the example shown in FIG. 10, the horizontal axis indicates the distance between the image forming unit 151 of K which is the reference color and the image forming unit 151 of each of the measurement target colors, and the vertical axis indicates the misregistration amount from the pre job registration reference value (or the during-job registration reference value). The controller 101 then calculates, from the regression expression D, the misregistration amount of white toner from the pre job registration reference value (or the during job registration reference value) as Sa shown in FIG. 10. This is because color misregistration during image formation is mainly caused by expansion/shrinkage of a rotator such as the roller 152 due to changes in temperature, so that the misregistration amount from the pre job registration reference value (or the during-job registration reference value) is in proportion to the distance between the image forming unit 151 of the reference color and the image forming units 151 of the measurement target colors.

An image forming apparatus having toner of a larger number of colors (for example, six colors) may be configured such that the register patch P3 is composed of four colors of YMCK, for example, and misregistration amounts of the other colors (for example, two of the six colors) are calculated based on a relative distance between each of the image forming units 151 of the other colors and each of the image forming units 151 of the four colors of YMCK.

Second Embodiment

Figure 11:
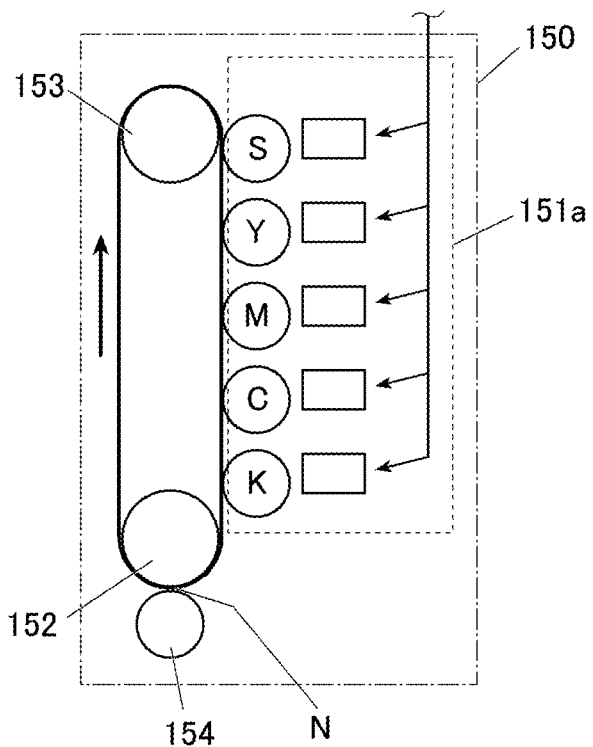
FIG. 11 is a diagram showing a configuration of an image forming section according to a second embodiment.

FIG. 11 shows the image forming section 150 included in the image forming apparatus 100 according to the present embodiment. In the image forming unit 151a according to the present embodiment that the image forming section 150 has, toner images of S (white), Y (yellow), M (magenta), C (cyan), and K (black) are formed on the intermediate transfer belt 153 in the order presented as shown in FIG. 11. In other words, toner images are formed on the recording medium PM in descending order of S, Y, M, C, and K.

The remaining configuration is similar to the configuration of the above-described first embodiment.

Figure 12:
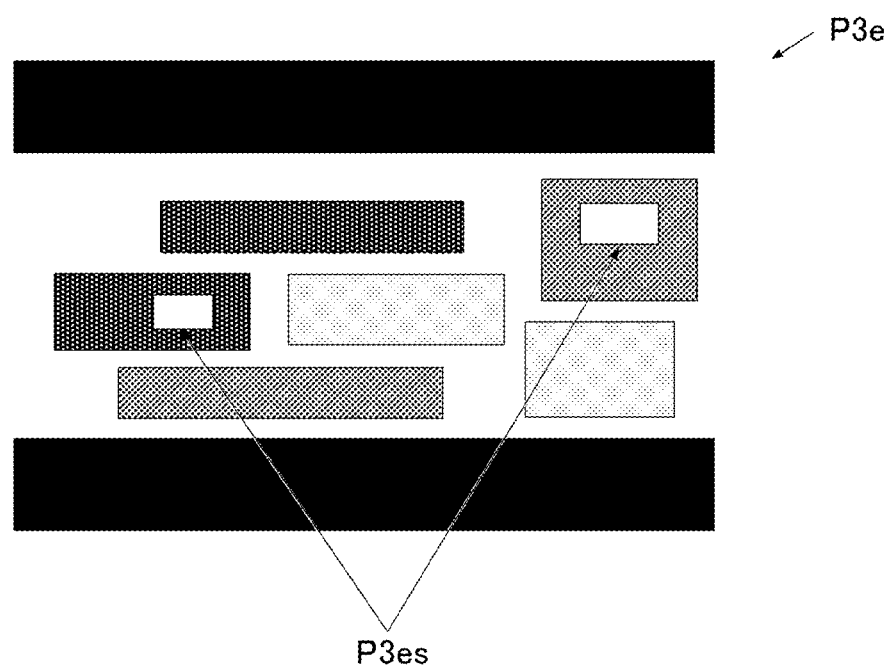
FIG. 12 is a diagram showing an example of a register patch according to the second embodiment.

In an image forming process according to the present embodiment, the controller 101 forms images of a register patch P3e as shown in FIG. 12. The controller 101 forms images such that patches P3es of a color material (e.g., white toner) that is less detectable with respect to the predetermined standard are included in patches of the other measurement target colors as shown in FIG. 12. The predetermined standard refers to a degree that the patches are read in a read image.

By thus configuring the register patch P3e, a region of patches of white toner is easily read in a read image even in the case in which the recording medium PM is white, and a registration correction value for white toner is calculated.

As described above, the image forming apparatus 100 includes a plurality of image forming units 151 that form images with color materials based on image data, the image forming apparatus 100 forming, on the recording medium PM, a color image obtained by superimposing images of respective colors formed by the image forming units 151, respectively. The image forming apparatus 100 includes an acquirer (the controller 101) that acquires a read image obtained by reading an image forming plane of the recording medium PM on which the color image has been formed, the controller 101 that causes images of the register patch P3 to be formed outside a job image forming region of the recording medium PM, and a corrector (the controller 101) that corrects image forming positions in the plurality of image forming units 151 based on the read image having been acquired by the acquirer including the register patch P3. The register patch P3 has a leading end patch and a rear end patch formed of a color material of a reference color at a predetermined interval in the sub scanning direction, and one or more measurement target color patches formed of color materials of respective measurement target colors between the leading end patch and the rear end patch. The corrector performs correction based on relative positions of the leading end patch and the rear end patch, and the measurement target color patches.

Consequently, patches for performing color misregistration correction are formed on a paper sheet in a smaller size, and color misregistration correction is performed.

The image forming apparatus 100 includes an intermediate transfer body (the intermediate transfer belt 153) on which the color image is formed by superimposing the images of the respective colors formed by the respective image forming units 151, a transfer unit (the roller 152 and the secondary transfer roller 154) that transfers the color image formed on the intermediate transfer body onto the recording medium PM, and a detector (the second image scanner 160) that detects the register patch P3, the images of which have been formed on the intermediate transfer body. The controller 101 includes a setter that causes the images of the register patch P3 to be formed on the intermediate transfer body before job-related image formation, and sets reference values (the pre job registration reference value) for the image forming positions of the plurality of image forming units 151 based on a detection result obtained by the detector, and the corrector calculates a correction value (the registration correction value) based on the reference value and the read image.

Consequently, color misregistration correction is performed based on the reference value having been set before job image formation and the read image acquired during the job image formation.

In the image forming apparatus 100, the measurement target color patches have different forms from each other, and the positions of ends of the measurement target color patches are different from each other in the main scanning direction and the sub scanning direction.

Consequently, even in the case in which color misregistration occurs in the register patch P3, the color misregistration is less noticeable, and the user is less likely to notice the occurrence of the color misregistration. Thus, when color misregistration in a non-defective product level occurs, the user is prevented from recognizing the occurrence of the color misregistration.

In the image forming apparatus 100, the minimum linewidth of the measurement target color patches is ten pixels or more at 600 dpi.

Consequently, even in a case in which image forming properties of the image forming section 150 are changed by an environmental change or the like, the first image scanner 180 correctly reads respective contours of the reference color patches P31, P32 and the measurement target color patch portion P33.

In the image forming apparatus 100, the controller 101 includes an identifier that causes images of the gradation patch P2 to be formed on the recording medium PM next to the register patch P3, and identifies the type of the gradation patch P2 based on the forms of the measurement target color patches.

Consequently, the gradation patch P2 is identified based on the forms of the measurement target color patches.

In the image forming apparatus 100, the leading end patch or the rear end patch also serves as a detection mark (the boundary line P21 or P23) of the gradation patch P2.

Consequently, the region in which images of the gradation patch P2 and the register patch P3 are to be formed is made smaller.

In the image forming apparatus 100, the corrector calculates a correction value (registration correction value) for a color material that is less detectable on the recording medium PM with respect to the predetermined standard, based on a correction value for another color material.

Consequently, even in the case in which the recording medium PM is white, a registration correction value for white toner is calculated.

In the image forming apparatus 100, the controller 101 causes an image of a measurement target color patch of a color material that is less detectable on the recording medium PM with respect to the predetermined standard to be formed so as to be included in a measurement target color patch of another color material.

Consequently, even in the case in which the recording medium PM is white, the registration correction value for white toner is calculated.

In the image forming apparatus 100, the recording medium PM is a continuous medium.

Consequently, color misregistration correction is performed even while an image is being formed on the continuous medium.

In the image forming apparatus 100, the controller 101 causes an image of the toner consumption patch P1 to be formed on the recording medium PM at a position identical to the position of the register patch P3 in the main scanning direction.

Consequently, a wider region is ensured for the job image forming region on the recording medium PM.

In the image forming apparatus 100, the controller 101 causes an image of the register patch P3 to be formed on the recording medium PM as an eye mark indicating an image forming position.

Consequently, the area in which images of various patches are to be formed is reduced to effectively utilize a paper width of the recording medium PM.

In the image forming apparatus 100, the distance between ends of the measurement target color patches having an identical color is at least not an integral multiple of a reading resolution in the sub scanning direction of a reader that reads the read image.

Consequently, an interpolation resolution is improved even in a case in which the reading resolution of the first image scanner 180 is not sufficient for reading the register patch P3, and the register patch P3 is correctly read.

The statement in the above-described embodiments is a suitable example of the image forming apparatus according to the present invention, and the present invention is not limited thereto.

For example, although it has been described in the above-described embodiments and modifications that the image forming apparatus 100 forms images on the recording medium PM which is a windable continuous medium, the present invention is not limited thereto. The recording medium PM may be flat paper or the like other than a continuous medium. By applying the present invention to an image forming apparatus that forms images on flat paper or the like, color misregistration correction for changes in an environment such as the temperature during continuous printing is carried out without temporarily suspending printing. This contributes to efficient printing operation, reduced down time or the like, and cost reduction.

Although it has been described in the above-described embodiments and modifications that the reference color is K (black), another color may be the reference color. However, it is preferable to use K as the reference color because the K patch is displayed at a high density in all pieces of R, G, and B separated image data.

Although it has been described in the above-described embodiments and modifications that the first image scanner 180 which is a reader is located in the image forming apparatus, the reader may be provided outside the image forming apparatus.

Although it has been described that in the image forming process according to the above-described embodiments and modifications, the during-job registration reference value is set in the first registration correction processing after image formation is started, the present invention is not limited thereto. An average value of measurement results in a predetermined number of times of (for example, approximately two to ten times depending on the amount of printing in the entire job) registration correction processing after image formation is started may be used as the during-job registration reference value. The measurement results refer to positions of patches of respective measurement target colors with respect to the positions of the reference color patches P31 and P32 of the register patch P3 calculated in step S45 of the registration correction processing.

After carrying out step S15 of the pre job reference value setting processing, images of the register patch P3 may be formed on the recording medium PM, and the during-job registration reference value may be set based on a read image obtained by reading the register patch P3 formed by the first image scanner 180. In this case, in the first registration correction after image formation in the image forming process is started, the difference between the pre job registration reference value and the value calculated in step S45 and the difference between the during-job registration reference value and the value calculated in step S45 are added up to calculate the registration correction value.

The during-job registration reference value may be acquired in advance in a state in which color misregistration does not occur in an image forming apparatus identical to the image forming apparatus 100 according to the above-described embodiments.

Although the above-described explanation discloses the example of using a non-volatile semiconductor memory or a hard disk as a computer-readable medium having a program for executing each processing stored thereon, the present invention is not limited to this example. As another computer-readable medium, a portable storage medium such as a CD-ROM is also applicable. As a medium for offering data on the program via a communication line, carrier waves may be applied.

In addition, a detailed configuration and a detailed operation of each unit constituting the image inspection apparatus can also be changed as appropriate within the scope of the present invention.

What is claimed is:

1. An image forming apparatus including a plurality of image forming units that form images with color materials based on image data, the image forming apparatus forming, on a recording medium, a color image by superimposing the images of respective colors formed by the respective image forming units, the image forming apparatus comprising a hardware processor that acquires a read image obtained by reading an image forming surface of the recording medium on which the color image has been formed, causes a register patch to be formed outside a job image forming region of the recording medium, and corrects image forming positions of the image forming units based on the acquired read image that includes the register patch, wherein the register patch includes a leading end patch and a rear end patch formed with a reference color material at a predetermined interval in a sub scanning direction and one or more measurement target color patches formed with measurement target color materials between the leading end patch and the rear end patch, wherein the hardware processor corrects the image forming positions based on relative positions of the leading end patch, the rear end patch, and the one or more measurement target color patches.

2. The image forming apparatus according to claim 1, further comprising:

an intermediate transfer body on which the color image is formed by superimposing the images of the respective colors formed by the respective image forming units;

a transfer unit that transfers the color image formed on the intermediate transfer body onto the recording medium; and a detector that detects the register patch formed on the intermediate transfer body, wherein the hardware processor causes the register patch to be formed on the intermediate transfer body before job-related image formation, sets reference values for the image forming positions of the respective image forming units based on a detection result by the detector, and calculates a correction value based on the reference values and the read image.

3. The image forming apparatus according to claim 2, wherein the hardware processor calculates a correction value for a color material that is less detectable on the recording medium with respect to a predetermined standard, based on a correction value for another color material.

4. The image forming apparatus according to claim 1, wherein
the measurement target color patches have different forms from each other, and
positions of ends of the measurement target color patches are different from each other in a main scanning direction and in the sub scanning direction.

5. The image forming apparatus according to claim 1, wherein a minimum linewidth of the measurement target color patches is ten pixels or more at 600 dpi.

6. The image forming apparatus according to claim 1, wherein the hardware processor causes a gradation patch to be formed next to the register patch on the recording medium and identifies a type of the gradation patch based on forms of the measurement target color patches.

7. The image forming apparatus according to claim 6, wherein the leading end patch or the rear end patch serves as a detection mark of the gradation patch.

8. The image forming apparatus according to claim 1, wherein the hardware processor causes a less-detectable measurement target color patch of a color material that is less detectable on the recording medium with respect to a predetermined standard to be formed such that the less-detectable measurement target color patch is included in another measurement target color patch of another color material.

9. The image forming apparatus according to claim 1, wherein the recording medium is a continuous medium.

10. The image forming apparatus according to claim 1, wherein the hardware processor causes a toner consumption patch to be formed on the recording medium at a position identical to a position of the register patch in a main scanning direction.

11. The image forming apparatus according to claim 1, wherein the hardware processor causes the register patch to be formed on the recording medium as an eye mark that indicates an image forming position.

12. The image forming apparatus according to claim 1, wherein a distance between ends of the measurement target color patches having an identical color is not an integral multiple of a reading resolution at least in the sub scanning direction of a reader that reads the read image.

13. A computer-readable non-transitory storage medium storing a program for a computer of an image forming apparatus that includes a plurality of image forming units for forming images with color materials based on image data and that forms, on a recording medium, a color image by superimposing the images of respective colors formed by the respective image forming units, the program causing the computer to:
acquire a read image obtained by reading an image forming surface of the recording medium on which the color image has been formed;
form a register patch outside a job image forming region of the recording medium; and
correct image forming positions of the plurality of image forming units based on the acquired read image that includes the register patch,
wherein the register patch includes
a leading end patch and a rear end patch formed of a color material of a reference color at a predetermined interval in a sub scanning direction and
one or more measurement target color patches formed of color materials of respective measurement target colors between the leading end patch and the rear end patch,
wherein the computer corrects the image forming positions based on relative positions of the leading end patch, the rear end patch, and the one or more measurement target color patches.

* * * * *